4 Sheets—Sheet 1.
C. B. LEE.
Ice-Making Apparatus.
No. 213,668. Patented Mar. 25, 1879.
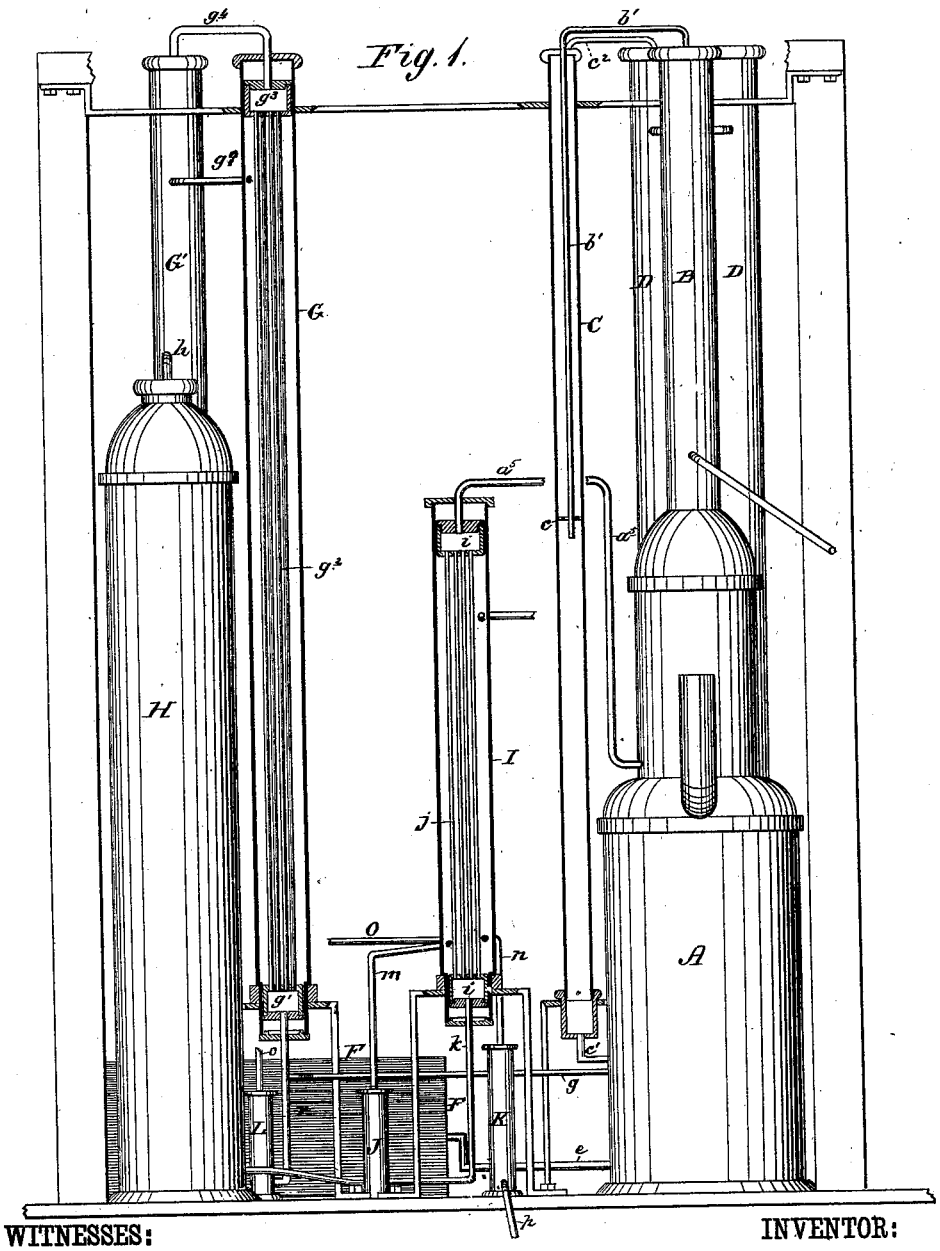
Fig. 1.
WITNESSES: <br>
W. W. Hollingsworth <br>
Edw. W. Byrn
INVENTOR: <br>
C. B. Lee <br>
BY  <br>
ATTORNEYS.

4 Sheets—Sheet 4.

C. B. LEE.
Ice-Making Apparatus.

No. 213,668. Patented Mar. 25, 1879.

WITNESSES:
W. W. Hollingsworth
Edw. W. Byrn.

INVENTOR:
C. B. Lee
BY
ATTORNEYS.

UNITED STATES PATENT OFFICE.

CHARLES B. LEE, OF GALVESTON, TEXAS.

IMPROVEMENT IN ICE-MAKING APPARATUS.

Specification forming part of Letters Patent No. 213,668, dated March 25, 1879; application filed October 18, 1878.

*To all whom it may concern:*

Be it known that I, CHARLES B. LEE, of the city and county of Galveston and State of Texas, have invented a new and Improved Ice-Making Apparatus; and I do hereby declare that the following is a full, clear, and exact description of the same, reference being had to the accompanying drawings, forming part of this specification, in which—

Figure 2:
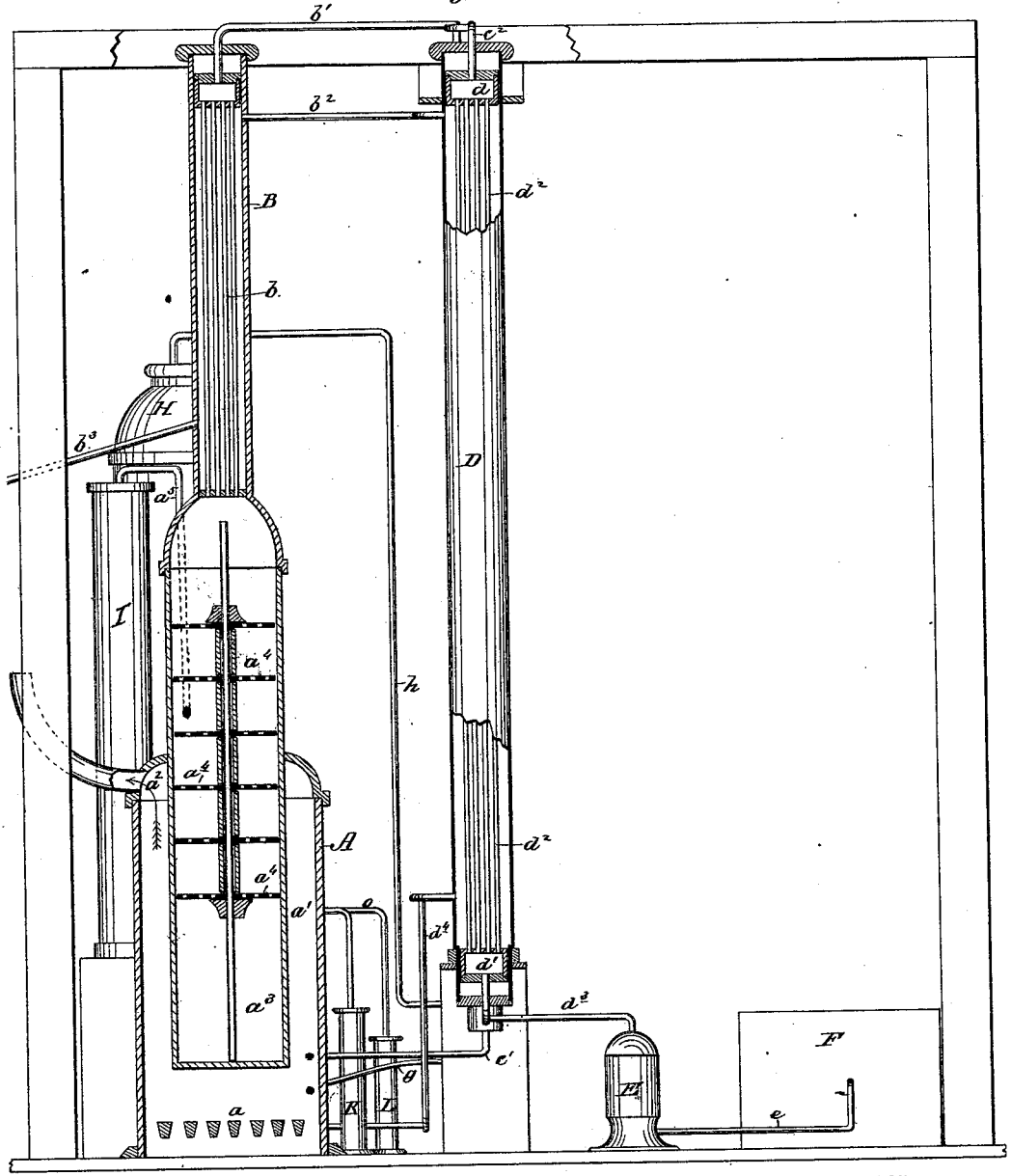
Figure 3:
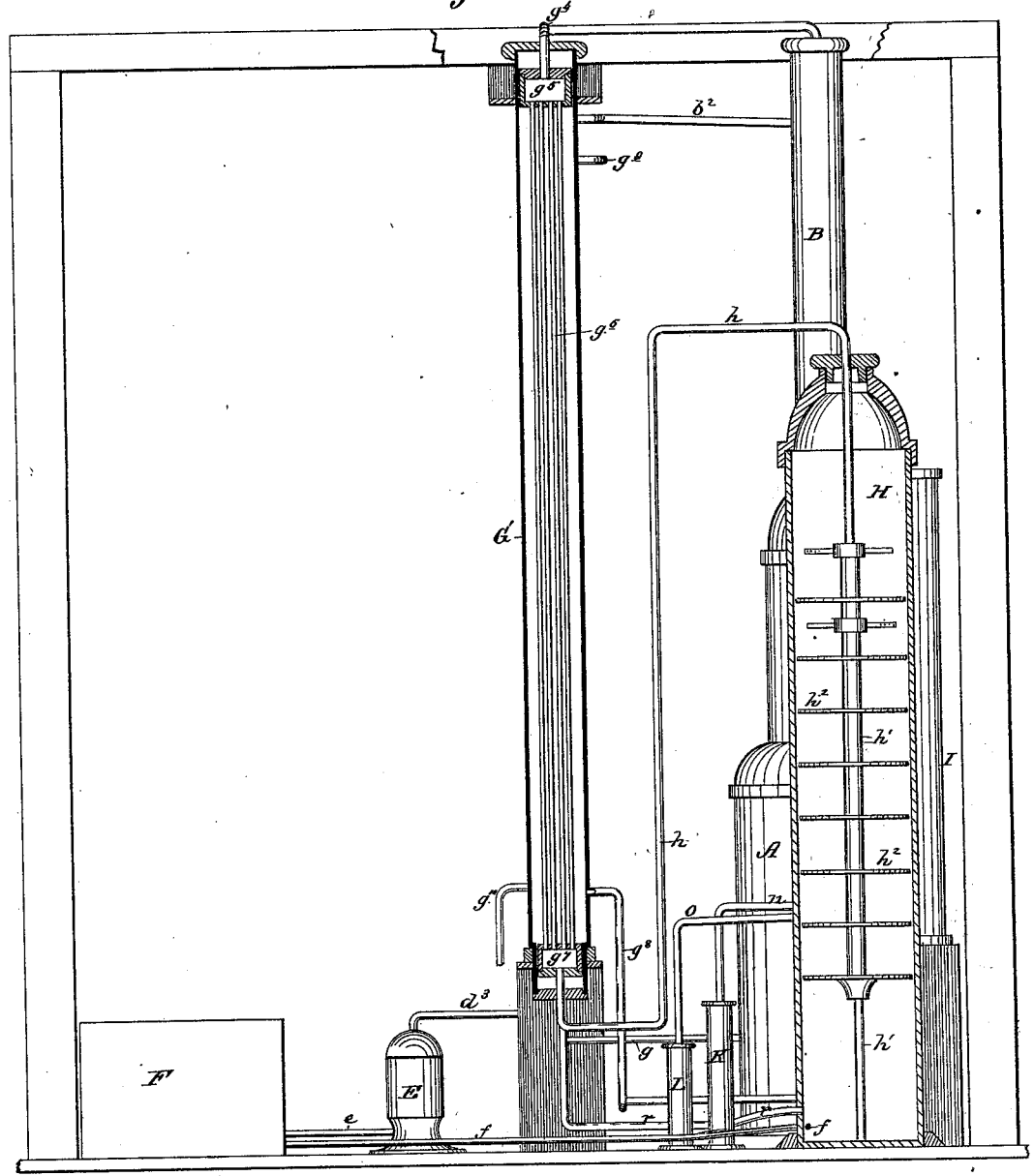
Figure 4:
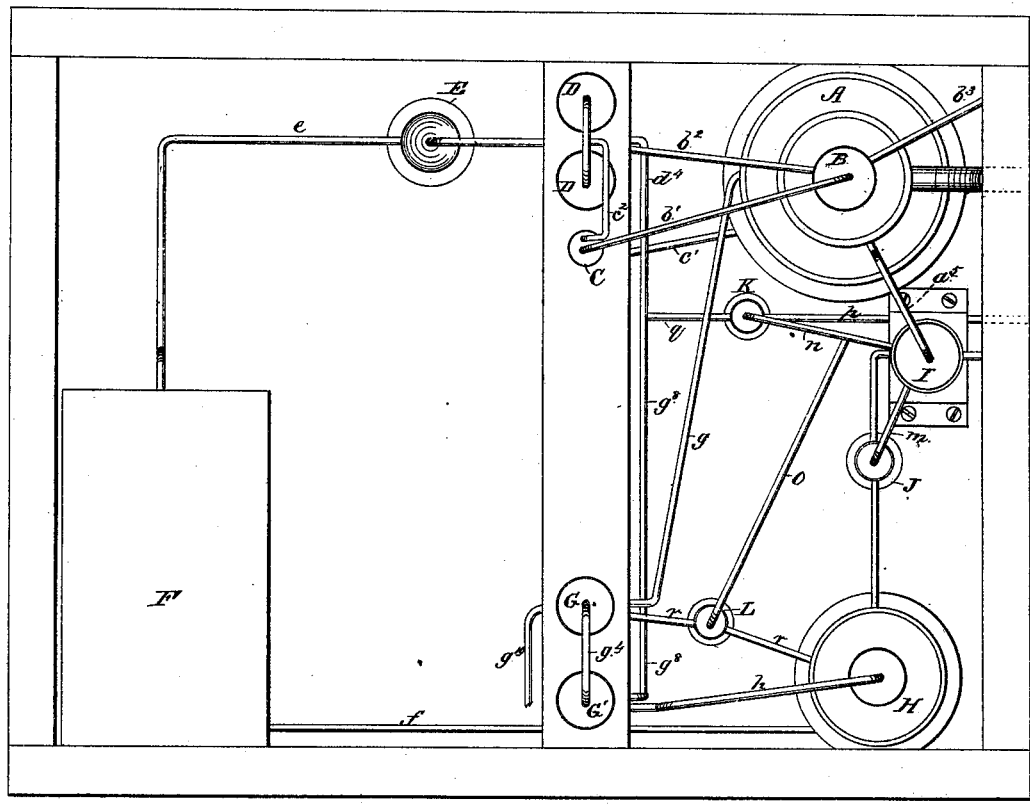
Figure 5:
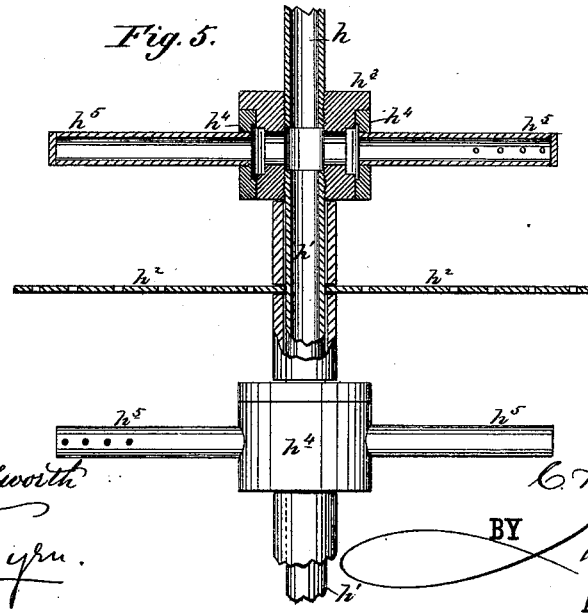

Figure 1 is a front elevation, with the cylinders C G I in section. Fig. 2 is a side elevation, with the generator and condensers shown in section. Fig. 3 is a side elevation from the opposite side, with the cylinder G' and the absorber shown in section. Fig. 4 is a top or plan view. Fig. 5 is an enlarged sectional detail of the sprinkling device in the top of the absorber.

My invention relates to certain improvements in that class of ice-making apparatus in which the vapor of ammonia or other similar volatile fluid is driven off from its solution by heat, is next condensed by being passed through cooling-pipes, and is then evaporated and expanded through pipes to produce the cold required for the freezing, the gas being subsequently recombined in an absorber with the poor liquid from which it was expelled in the heater or generator.

The improvement consists, first, in the arrangement between the generator and the condensers proper of a peculiar form of intermediate condenser, located upon the top of the generator, and designed to better separate and throw down into the generator again any steam or aqueous vapor which might otherwise pass over with the pure liquid ammonia and involve trouble; secondly, in the peculiar construction and arrangement of a trap-chamber designed to prevent the ammoniacal liquor from boiling over and passing into the condensers, which would involve the same objectionable results; and, thirdly, in the peculiar construction and arrangement of a device, located between the absorber and generator, for heating the concentrated liquor as it comes from the absorber before it is admitted to the generator proper, all as hereinafter more fully described.

In the drawings, A represents the generator, in which generator the pure ammoniacal gas is driven off from its mother-liquor by heat. B is the intermediate condenser; C, the trap-cylinder; D, the condenser proper; E, the receiver for the pure liquefied gas; F, the congealing-box, in which the liquefied gas is expanded through pipes to freeze the water into ice; G, cooling-cylinders, for reducing the temperature of the hot mother-liquor taken from the generator before it is admitted to contact with the gas from the congealer, and H the absorber in which the gas from the congealer is reabsorbed by the mother-liquor taken from the cooling-cylinders connecting with the generator.

In the several parts of the apparatus thus named the gas and mother-liquor continuously circulate, the pure gas being driven off by heat from the generator A, and then passing through B and C to the condensers, where it is liquefied by being passed through pipe surrounded by a current of cold water. The liquefied gas then enters the receiver E and passes thence into the congealer, where it does the work of freezing. Meanwhile the hot and poor liquor from the generator is taken through the cooling-cylinders G and carried thence to the top of the absorber H, in which it absorbs the pure gas that comes from the congealer, and forms a liquid ready to be used over again in the generator.

The generator A (see Fig. 2) is provided with a fire-box and grate, $a$, an annular smoke-chamber, $a^1$, a smoke-pipe, $a^2$, and a receptacle, $a^3$, for the ammoniacal liquor, in which is arranged upon a central support a series of horizontal perforated plates, $a^4$, upon which the liquor drops as it enters through pipe $a^5$, the retardation and dripping of the liquor through the perforated plates serving to permit the gas to be more readily disengaged by heat from the mother-liquor in which it is absorbed.

As the gas passes off at the top of the generator it traverses, before entering the condenser proper, the intermediate condenser B and trap-cylinder C. The function of the intermediate condenser is as follows: With this type of ice-machine too great a heat in the generator will sometimes cause steam or aqueous vapor to pass over with the gas, and this steam condenses into water in the receiver and congealer pipes and freezes, so that it becomes a serious obstacle.

To keep down the water in the generator I employ the intermediate condenser B, which consists of a cylinder located vertically upon the generator, and having within the same a set of straight parallel pipes, $b$, opening into the generator below, and opening at the top into a drum connected with the pipe $b^1$. Through these pipes $b$ the gas passes upwardly, while around these pipes, within the outer shell or cylinder, a constant current of water is kept circulating, which enters through the pipe $b^2$ and discharges through $b^3$. Now, inasmuch as the aqueous vapors condense at a much higher temperature than the ammoniacal vapors do, it will be seen that the steam is thrown down into the generator without affecting the passage of the ammonia-gas, and the presence of water is thus avoided in the receiver and congealer-pipes.

As the gas passes out through pipe $b^1$ before it enters the condenser, it is made to enter the trap-cylinder C, (see Figs. 1 and 4,) whose function is as follows: If the ammoniacal liquor boils up and over into the condenser, a proportion of water will still get into the congealer-pipe, and produce the aforementioned objectionable results. To avoid this contingency, I provide the long vertical cylinder C, in which the pipe $b^1$ descends to near its middle, and has near its end a perforated plate, $c$. The bottom of the cylinder communicates with the generator through pipe $c^1$, while the top communicates with the condensers D through the pipe $c^2$.

Now, if any aqueous fluid should bubble up and pass into pipe $b^1$ from the boiling action, the cylinder C acts as a trap, the water going to the bottom, and passing back to the generator, while the gas ascends through the perforated plate $c$ and enters the condensers through pipe $c^2$.

The condensers D (see Fig. 2) consist of a pair of cylinders about nine inches diameter and thirty feet high, arranged vertically, and secured at the bottom by a suitable frame support or pedestal, and at the top by the upper timbers of the building. In each of these cylinders is arranged at the top an end drum, $d$, communicating with pipe $c^2$, and at the bottom an end drum, $d^1$, communicating with pipe $d^3$, leading to the receiver E, the said drums being connected by a series of straight parallel pipes, $d^2$, traversing the length of the tube. Through these drums and tubes the gas passes as it is delivered to them by pipe $c^2$, and from which it, after being liquefied, is discharged and fed to the receiver by pipe $d^3$, communicating with the lower drums. As the gas passes through these tubes a continuous circulation of cold water upon their exterior is kept up through the inlet-pipe $d^4$ and the outlet-pipe $b^2$. The liquefied gas then passes from the receiver E through pipe $e$ to the congealer F, which is of the ordinary construction—that is to say, a series of pipes are provided, through which the liquid is evaporated and the gas expanded to produce cold, which pipes are immersed in a non-congealable liquid, such as brine or other analogous liquid, and in which non-congealable liquid and the cans holding the water to be frozen are immersed. After the gas has done its work in the congealer it passes through pipe $f$, Figs. 3 and 4, to the absorber H.

At the same time that the foregoing operation is being conducted the poor, but hot, liquor left in the bottom of the generator is taken through pipe $g$, Figs. 1 and 4, to the cooling-cylinder G to be divested of its heat before recombination with the gas from the congealer. These cooling-cylinders G G', of which two are used, are made precisely like the condensers D, and arranged in similar relation to the upper timbers of the building. The pipe $g$ feeds the poor ammoniacal liquor to the lower drum, $g^1$, of cylinder G, and it then traverses the pipes $g^2$, Fig. 1, to the upper drum, $g^3$, and, passing then to the other cylinder, G', through pipe $g^4$, enters the upper drum, $g^5$, Fig. 3, of this cylinder. It then passes down the tubes $g^6$ to the lower drum, $g^7$, whence it emerges and passes through the pipe $h$ to the top of the absorber. As the hot liquor passes it is cooled by cold water circulating on the exterior of the tubes in the cylinders, which water is admitted through pipe $g^8$, Figs. 3 and 4, rises in the cylinder G', passes thence at the top to G through pipe $g^9$, Fig. 1, and, after descending, is discharged through pipe $g^{10}$, passing in opposite direction to the flow of the hot liquor.

The absorber H (see Figs. 3 and 5) is a vertical cylinder, in which is arranged a central stem, $h^1$, supporting a series of perforated plates, $h^2$. The gas passing from the congealer to the absorber through pipe $f$ and the poor liquor passing into the top of the absorber through the pipe $h$ are then recombined in the following manner preparatory to being worked over again in the generator.

The upper end of the central stem $h^1$ of the absorber is made hollow, (see Fig. 5,) and with it communicates the pipe $h$, introducing the poor liquor. This hollow end is provided between the partitions with hubs $h^3$, having radial openings, and about these hubs there revolves a chambered ring, $h^4$, having hollow arms $h^5$, closed at their outer end, and perforated with small holes on the sides. The poor liquor then, coming from the pump under pressure, enters the hollow end of the central stem, and is distributed to the arms, and as the water emerges in lateral jets the arms are rotated upon a well-known principle.

As the poor ammoniacal liquor is sprinkled around upon the perforated plates the gas from pipe $f$ rises through the slowly-dripping spray and is absorbed thereby, and the liquor made concentrated, ready to be again used in the generator.

Before conducting the concentrated liquor to the generator, I have found that it is desirable to heat it just before it enters. This I accomplish by an apparatus, I, (see Fig. 1,) constructed after the manner of the condensing and cooling cylinders, with upper and lower drums $i\ i$ and intermediate pipes $j$ contained in a cylindrical shell. To the lower drum the strong liquor is fed from the absorber by the pipes $k$ and circulating-pump J, and after traversing the pipe $j$ it is delivered through pipe $a^5$ into the generator. As it passes through the apparatus I it is heated by the exhaust-steam from the circulating-pumps J K L, which discharge steam through pipes $m\ n\ o$ into the space about the pipe in the cylinder I.

Of the pumps required with this apparatus the one J, just referred to, transfers the concentrated liquor from the absorber to the generator. K is the water-circulating pump, and it takes water through the pipe $p$ and sends a current which divides at $q$, Fig. 4, one part going through the condensers D and B, and the other through the cooling-cylinders G G', while the pump L serves, through pipes $r\ r$, (see Figs. 3 and 4,) to keep up a constant circulation between the absorber and the circulating-pipes of the cooling-cylinders G G'. This is rendered necessary by reason of the fact that the absorption of the ammonia-gas at the bottom of the absorber heats the liquid, so that it will not sufficiently take up fresh quantities of the gas. This pump L takes out this hot liquid and runs it through the poor-liquid pipes in the cooling-cylinders G G'.

With respect to the feature of the intermediate condenser I do not claim, broadly, the location of such a condenser between the generator and condenser proper, but only the particular form of intermediate condenser constructed of a series of straight pipes connected at the top by an end drum, and located upon and directly above the generator in vertical position, so that the condensations of aqueous vapors have a direct vertical fall into the generator, and are better able to overcome the friction of the rising gas.

With respect to the operation of heating the enriched liquor before admitting it to the generator, I am aware that in the patent to Reece, October 1, 1872, it is proposed to heat the enriched liquor before being used in his so-called "analyzer" by the superfluous heat of the hot and poor liquor on its way to the absorber; and I therefore limit this feature of my invention to the combination of the heater with the exhaust-pipe of the steam-pumps, whereby the heat of the exhaust-steam is utilized.

Having thus described my invention, what I claim as new is—

1. The combination, with the generator and the condenser of an ice-making apparatus, of an intermediate condenser effecting communication between the two, constructed of a series of vertical and parallel tubes located upon the top of the generator, and communicating with said generator at the bottom and with a drum at the top, substantially as and for the purpose described.

2. The combination, with the generator and the condenser, of the trap-cylinder C, consisting of a vertical cylindrical shell having communication with the generator at the bottom and the condenser at the top, and provided with a pipe, $b^1$, extending down into the said shell, and communicating with the upper portion of the generator, substantially as shown and described.

3. The heating apparatus I, consisting of an outer shell, with end drums and parallel connecting-tubes, combined with the exhaust-pipes of the steam-pump, the absorber, and the generator, so as to heat the concentrated liquid before entering the generator, substantially as described.

The above specification of my invention signed by me this 8th day of October, A. D. 1878.

CHARLES B. LEE.

Witnesses:
SOLON C. KEMON,
EDWD. W. BYRN.